United States Patent [19]
Benson

[11] Patent Number: 4,779,644
[45] Date of Patent: Oct. 25, 1988

[54] AIRCRAFT ENGINE BLEED AIR FLOW BALANCING TECHNIQUE

[75] Inventor: Paul A. Benson, Palos Verdes Estates, Calif.

[73] Assignee: Allied-Signal Inc., Morris Township, N.J.

[21] Appl. No.: 880,404

[22] Filed: Jun. 30, 1986

Related U.S. Application Data

[62] Division of Ser. No. 699,753, Feb. 8, 1985, Pat. No. 4,671,318.

[51] Int. Cl.$^4$ .............................................. F02C 6/00
[52] U.S. Cl. .................................. 137/606; 60/39.07; 60/39.15
[58] Field of Search ................. 60/39.07, 39.15, 39.29; 415/26, 27, 28; 98/1.5; 137/486, 489, 606

[56] References Cited

U.S. PATENT DOCUMENTS

| | | | |
|---|---|---|---|
| 2,000,721 | 5/1935 | Standwick | 415/27 |
| 2,459,000 | 1/1949 | Morris | 98/1.5 |
| 2,648,490 | 8/1953 | Messinger et al. | 137/486 |
| 2,723,615 | 11/1955 | Morris et al. | 98/1.5 |
| 4,384,818 | 5/1983 | Motenberg | 415/17 |
| 4,506,594 | 3/1985 | Rowland et al. | 137/486 |

FOREIGN PATENT DOCUMENTS 1097216  1/1961  Fed. Rep. of Germany ..... 60/39.07

Primary Examiner—Louis J. Casaregola
Attorney, Agent, or Firm—R. Steven Linne; James W. McFarland

[57] ABSTRACT

A bleed flow modulator is used in conjunction with pressure regulating valves regulating bleed air pressure from each engine to a common manifold. The bleed flow modulator monitors the pressure drop across a heat exchanger, which pressure drop is proportional to flow rate of bleed air through the heat exchanger. By providing a limited authority negative feedback signal to the pressure regulating valve from the bleed flow modulator, flow rate of bleed air from each engine to the common manifold is kept near a desired uniform value, thereby achieving balanced flow extraction of bleed air from the aircraft engines.

21 Claims, 2 Drawing Sheets

AIRCRAFT ENGINE BLEED AIR FLOW BALANCING TECHNIQUE

This is a division of application Ser. No. 699,753 filed Feb. 8, 1985 (U.S. Pat. No. 4,671,318).

BACKGROUND OF THE INVENTION

The invention relates to equipment used on aircraft to deliver compressed air from the power source, typically a turbine engine, to other air systems requiring a continuous supply of air such as environmental control systems, and more particularly to a system for controlling bleed air supplied by the engines of multi-engine aircraft in order to ensure a balanced supply of bleed air from each of the engines on the aircraft, thereby achieving balanced flow extraction.

With the exception of a limited number of smaller aircraft, most aircraft utilizing turbine engine propulsion units, both commercial and military, are powered by two or more turbine engines. Virtually all such aircraft divert bleed air from the engines to supply various other systems, most notably environmental control systems (ECS) which require a supply of conditioned air which is utilized for the crew and passenger environment, and in some instances electronic equipment onboard the aircraft is cooled by a portion of the bleed air.

It has been recognized for quite some time that in order to efficiency operate a multiple engine aircraft it is desirable to utilize bleed air supplied from all of the engines rather than from only one power plant. If, for example, the entire supply of bleed air to the aircraft is supplied by one engine, the result is significantly deteriorated overall aircraft fuel economy as well as excessive wear to the engine supplying the bleed air, since that engine also has to carry its share of the aircraft propulsion duties. Bleed air control systems have developed some degree of sophistication, and typically utilize a pressure regulating valve to control the amount of bleed air supplied from each engine to a heat exchanger used to cool the bleed air from that engine, with the cooled air from all the engines then being fed into a common manifold prior to distribution onboard the aircraft.

Aside from this rather significant accomplishment, most effort in the art of bleed air control systems has been directed toward preventing compressor surge in the various stages of the gas turbine engine by bleeding airflow from appropriate stages during certain flight conditions, with the excess air bled off tyically being dumped into the ambient atmosphere. Two examples of such systems are U.S. Pat. Nos. 3,179,356 and 3,505,817, both of which are used to prevent back flow into lagging engines, and bleed flow to the atmosphere when there is excessive bleed air to prevent compressor surge. While in most cases acceptable performance has been achieved by existing systems, there remains one troubling problem plaguing bleed air control systems, with this problem posing significant (and expensive) instances of deteriorated system performance.

It will be recognized that pressure regulating valves are reasonably sophisticated mechanical devices, and as such are susceptible to some degree of mechanical tolerance inherent in the performance characteristics of such valves. Pressure regulating valves are designed to regulate bleed air pressure of air supplied from an engine to a heat exchanger, and typically operate with a tolerance of plus or minus 2.5 psig. While such a tolerance seems relatively good in view of the fact that this represents an error of approximately plus or minus 4%, it does nevertheless present a potentially highly damaging situation.

Using by way of an example an aircraft having two engines with both engines supplying bleed air, consider the case when one pressure regulating valve on the first engine has an error allowing pressure to be slightly larger than desired, for example 2 psig higher than desired, and the second pressure regulating valve on the other engine has an error in the opposite direction so that air leaving the second pressure regulating valve is 2 psig below the desired value. In this case, the pressure regulating valve supplying air at the higher pressure will supply significantly more air than the pressure regulating valve supplying air at the lower pressure, which means that one engine is supplying significantly more bleed air than the other engine.

While the situation thusly described is serious and has a detrimental effect on overall aircraft performance, an even more serious consequence is likely to occur when the difference in supply pressure is more than minimal. If there is a difference of several psig in air supplied by two pressure regulating valves, as in the example just described, the result can be that the higher pressure regulating valve will force air backwards in the system in the wrong direction through the lower pressure regulating valve, a situation which is known as the higher regulator swamping out the lower regulator. When this occurs, one engine will supply all of the bleed air required by the aircraft and the other engine will supply no bleed air at all, since the regulating valves are designed to prevent reverse flow of air therethrough by closing.

The results of pressure regulating valve error are present to some degree even with fairly small amounts of error in the pressure regulating valves, with the results of such imbalance increasing in severity with the magnitude of the error. The most immediately noticeable result is substantially diminished aircraft fuel economy, since the engine supplying significantly more bleed air will burn more fuel than the other engine saves. It will be appreciated that such a reduction in fuel economy will have severe economic results, particularly in the case of commercial aircraft.

A second and even more expensive result of the problem is an increased level of engine distress. The engine required to supply substantially more bleed air will wear out significantly faster, since the blades of the turbine engine will be running hotter due to the increased amount of bleed air tapped off due to the engine pressure regulating valve supplying air at a higher pressure than the other engine(s) pressure regulating valves. This results in the requirement that the engine be rebuilt or replaced at a substantially earlier time and with substantially fewer hours on the engine.

While the previous discussion has concentrated on the example of a twin engine aircraft, it is apparent that the pressure regulation problem will be at least as severe on aircraft having more than two engines. For example, if a four engine aircraft has one pressure regulating valve supplying air at higher pressure than the other three, it is possible for that pressure regulating valve to swamp out the other three regulating valves, thereby requiring a single engine to supply all the bleed air utilized by the aircraft. The results in this case are an unacceptably serious reduction in both fuel economy and engine wear characteristics. It is therefore seen that a system to ensure more accurate pressure regulation of bleed air is highly desireable since such a system would result both in better aircraft economy and a lower degree of mechanical wear in the engine. Such a system, whether utilized on a two engine aircraft or an aircraft having more than two engines will likely pay for itself in a relatively short operating time, and therefore represents a highly desireable addition to any bleed air control system.

SUMMARY OF THE INVENTION

The present invention utilizes a bleed flow modulator in conjunction with each pressure regulating valve to ensure that the pressure regulating valve does not supply more bleed air than desired from the engine regulated by the pressure regulation valve. The bleed flow modulator is a pressure differential sensing device which measures a pressure drop across a portion of the normal bleed air delivery equipment prior to supply of the bleed air to the common manifold. In the preferred embodiment, the bleed flow modulator measures the pressure differential across the heat exchanger which is immediately downstream from the pressure regulating valve.

Since pressure drop is related to flow volume, the bleed flow modulator thereby senses flow of bleed air through the heat exchanger. The bleed flow modulator provides a negative feedback signal to the pressure regulating valve whenever an excessive pressure drop is sensed across the heat exchanger, thereby indicating excessive flow being supplied by the pressure regulating valve. This negative feedback signal provided by the bleed flow modulator to the pressure regulating valve causes the pressure regulating valve to close somewhat, thereby reducing the flow through that particular pressure regulating valve.

By installing a bleed flow modulator on each engine/pressure regulating valve combination, the amount of flow supplied by each of the engines on an aircraft is thereby equalized, thus resulting in a balanced flow extraction of bleed air from the engine.

Since each of the engines on an aircraft supplies almost exactly the same amount of bleed air, none of the engines has to operate at a higher power level than the other engines, thereby optimizing fuel economy and minimizing engine distress. By utilizing the present invention in a multiple engine aircraft, the engines will run cooler and last longer, thereby further reducing operating costs. It is therefore apparent that the present invention represents a highly desirably bleed air control system, and one which will likely pay for itself many times over in the operation of the aircraft.

DESCRIPTION OF THE DRAWINGS

These and other advantages of the present invention are best understood with reference to the drawings, in which.

DETAILED DESCRIPTION OF THE PREFERRED EMBODIMENT

Figure 1:
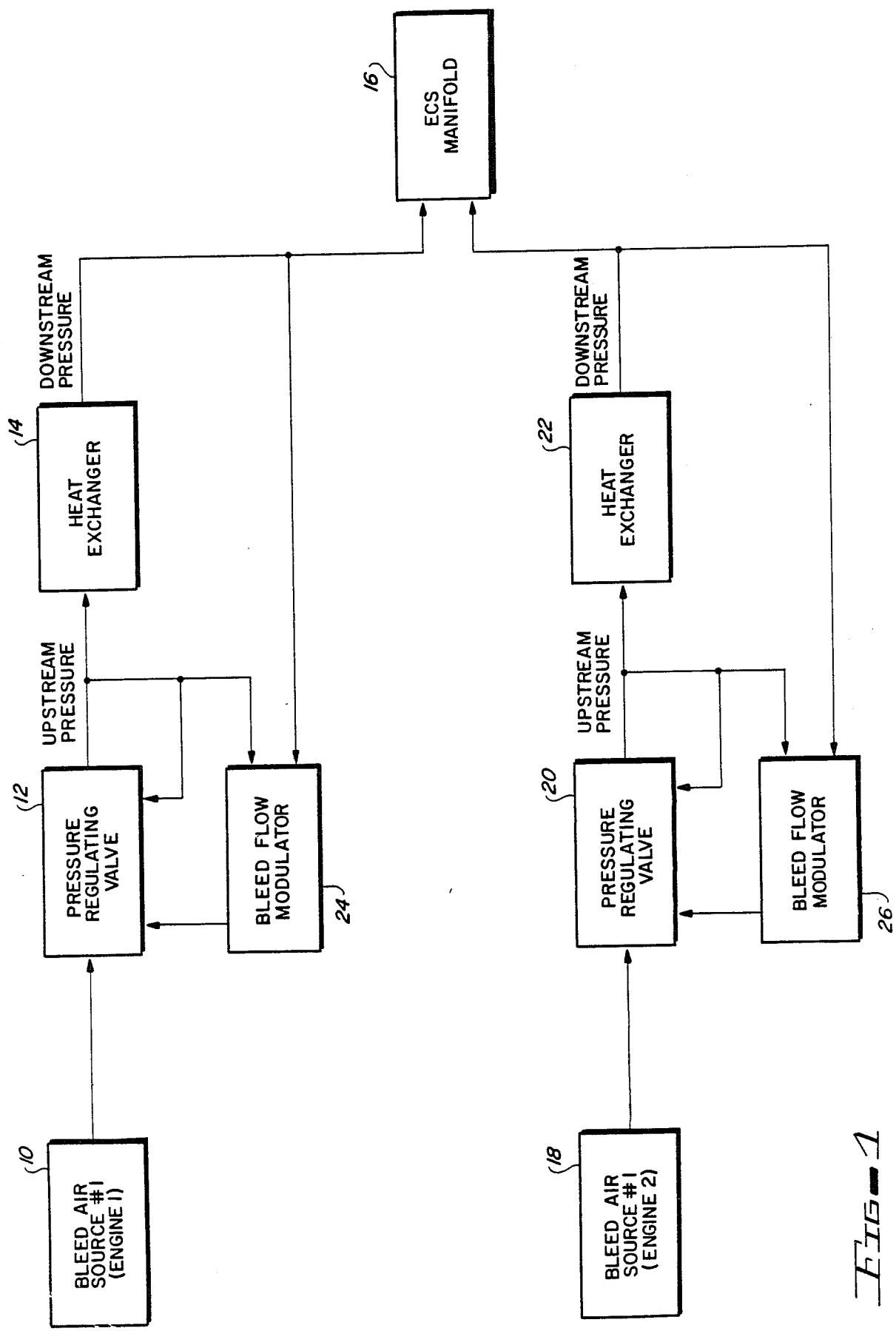
FIG. 1 is a flow chart of the operation of the present invention in a two engine aircraft, illustrating how the bleed flow modulator is installed and operates in the system.

The flow diagram of FIG. 1 illustrates the operation of a system embodying the present invention in a two engine aircraft. Although a two engine aircraft is used as a specific example herein, it will be recognized by those skilled in the art that the present invention is equally applicable to use on any aircraft having multiple engines from which bleed air is supplied. It should also be noted that with regard to particular construction and operation of the present invention, its use on a single leg of the system, that is on a single engine, pressure regulating valve, and heat exchanger combination is described. The construction and operation of the system on each of the legs of the bleed air supply system in a multi-engine aircraft is identical, and therefore discussion of only a single leg of the system is necessary.

As shown in FIG. 1, bleed air source #1 (which is the first engine of the aircraft) is referred to generally as source 10, and is a source of a bleed air flow, the particulars of which are well known in the art. Source 10 supplies bleed air to a pressure regulating valve 12, which operates to regulate the pressure of the bleed air supplied to a heat exchanger 14. Pressure regulating valve 12 in a typical example will regulate the pressure to 58 psig, and accordingly, bleed air is supplied at 58 psig to the heat exchanger 14, where the bleed air is typically cooled.

The heat exchanger 14 then supplies the bleed air to an ECS manifold 16, which is a common manifold to which bleed air is supplied from all the engines on the aircraft. In a similar manner, the second engine of the two engine aircraft used as an example is bleed air source #2, specifically identified as source 18 in FIG. 1. Source 18 supplies bleed air to a second pressure regulating valve 20, which, in turn, supplies bleed air at approximately 58 psig to a second heat exchanger 22. The heat exchanger 22, which also typically cools the bleed air supplied to it, also supplies the cooled bleed air to the ECS manifold 16.

It will be appreciated by those skilled in the art that the system as described to this point is well known in the art, and presents all of the problems described above. The present invention solves these problems by using a bleed flow modulator in combination with each pressure regulating valve to accurately regulate the flow from each engine to the ECS manifold 16. Specifically, a bleed flow modulator 24 is used in combination with the pressure regulating valve 12 to regulate the flow of bleed air through the heat exchanger 14, and a second bleed flow modulator 26 is used in combination with the second pressure regulating valve 20 to regulate the flow of bleed air through the second heat exchanger 22.

It will be immediately recognized by those skilled in the art that the pressure regulating valves 12, 20 utilize negative feedback to obtain a relatively accurate pressure regulation of the bleed air flow. Specifically, pressure on the outlet end of the pressure regulating valves 12, 20 is monitored by the pressure regulating valves 12, 20, this pressure value being designated the upstream pressure in FIG. 1, and corresponding to the pressure of the bleed air as supplied to the heat exchangers 14, 22.

The bleed flow modulators 24, 26 operate as a function of both upstream pressure, the pressure of bleed air supplied to the heat exchangers 14, 22, relatively, and downstream pressure, which is the pressure of bleed air exiting heat exchangers 14 and 22, relatively. The bleed flow modulators 24, 26 provide feedback signals to the pressure regulating valves 12, 20, respectively, in order to balance the flows supplied by the heat exchangers 14, 22 to the ECS manifold 16. The operation of the bleed flow modulators 24, 26 is based on a mathematical relationship between pressure drop across the heat exchangers 14, 22 and the flow through the heat exchangers 14, 22.

This relationship may be approixmated by the formula Pressure Drop=f times $w^2$, where Pressure Drop is the pressure differential across a heat exchanger, w is flow through the heat exchanger, and f is a constant based on density of the bleed air and the particular mechanical design of the heat exchanger. Form this formula it is apparent that flow of bleed air through the heat exchangers 14, 22 is directly dependent upon the pressure drop across the heat exchangers 14, 22. Therefore, if the pressure drops across the heat exchangers are regulated, the results will be that the flow from the two heat exchangers 14, 22 will be balanced to cause the extraction of bleed air from sources 10, 18 to be identical.

Therefore, since the bleed flow modulators 24, 26 monitor both upstream pressure and downstream pressure, they may be manufactured and adjusted so as to regulate the system by providing a negative feedback to the pressure regulating valves 12, 20 respectively. When the flow through either of the heat exchangers 14, 22 rises beyond the flow rate selected by the bleed flow modulators 24, 26, respectively, the bleed flow modulators will provide a limited authority negative feedback signal to the pressure regulating valves 12, 20, respectively, thereby resulting in flow being reduced to a value representing the desired bleed air flow through the heat exchangers 14, 22.

Figure 2:
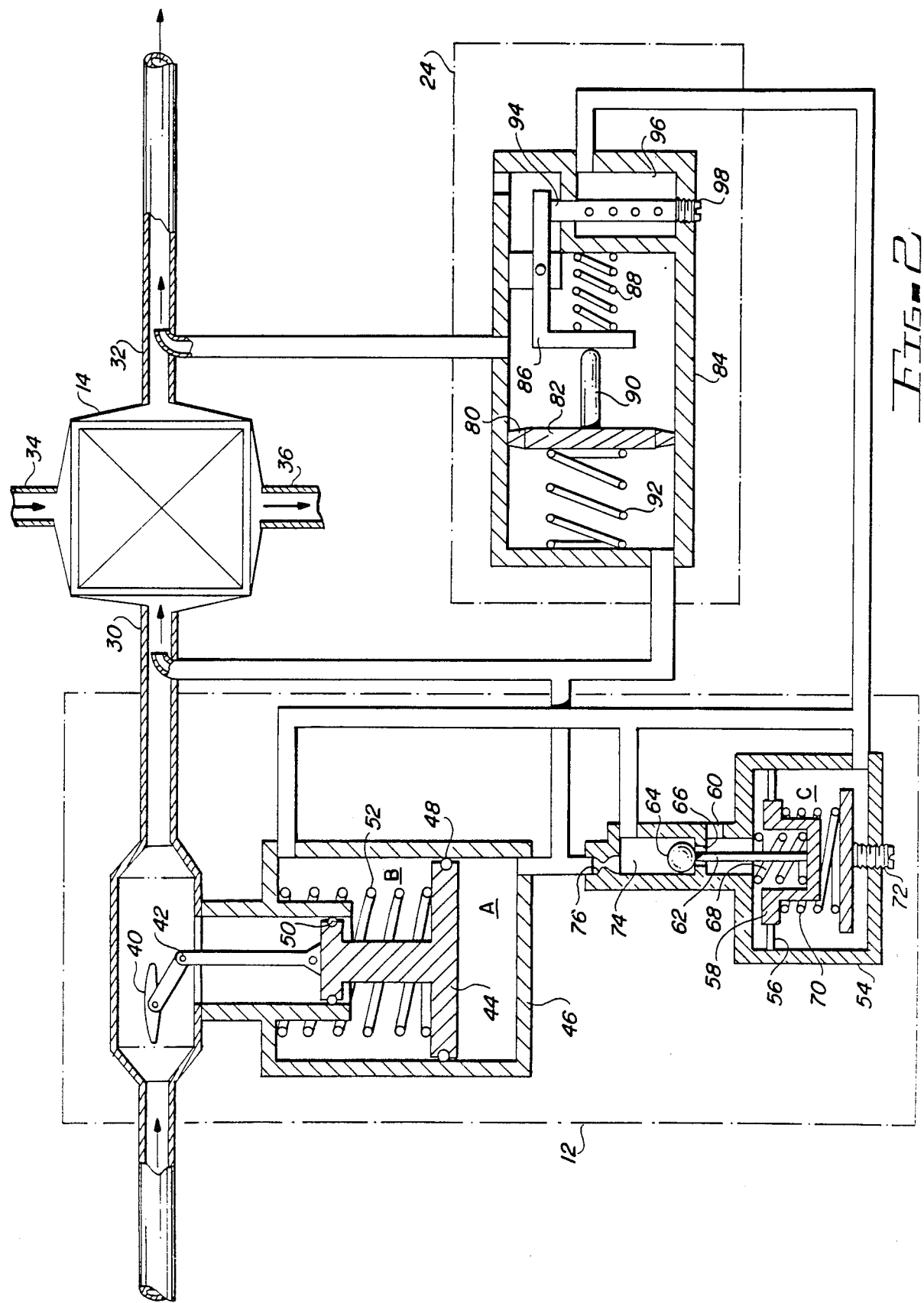
FIG. 2 is a schematic illustration of one leg of the system illustrated in FIG. 1, showing a bleed flow modulator installed in combination with a pressure regulating valve and a heat exchanger.

Now that the operating principles of the system have been explained with reference to FIG. 1, FIG. 2 illustrates the top leg of the system shown in FIG. 1, namely that consisting of the pressure regulating valve 12, the heat exchanger 14, and the bleed flow modulator 24. The heat exchanger 14 has an inlet 30 to which bleed air is supplied from the pressure regulating valve 12, the bleed air originating from the source 10 (FIG. 1). The bleed air is cooled in the heat exchanger 14, and exits the heat exchanger through an exit 32. An additional entrance 34 and exit 36 to the heat exchanger are illustrated, which entrance and exit are for the flow path of the cooling air used to cool the flow of bleed air in the heat exchanger 14. The supply of cooling air to a heat exchanger is well known in the art.

The pressure regulating valve 12 illustrated in FIG. 2 is a spring loaded open, pneumatically actuated butterfly type pressure regulating valve. A butterfly valve is used to selectively block or allow passage of the bleed air flow through the pressure regulating valve 12. The butterfly valve is connected by a mechanical linkage 42 to a piston 44 slidably mounted in a valve housing 46. The valve housing 46 is divided into two chambers, namely chamber A on one side of the piston 44 and chamber B on the opposite side of the piston 44. An O-ring 48 mounted on the piston 44 is used to provide a seal between chambers A and B, with a second O-ring 50 being utilized to seal the valve housing 46 at the end at which the mechanical linkage 42 is connected to the piston 44.

A spring 52 is located inside the valve housing 46 and bearing against the piston 44 in chamber B. It is therefore apparent that the pressure in chamber B and the pressure exerted by the spring 52 will operate to cause the piston 44 to move in a direction causing the butterfly valve 40 to be open, while pressure in chamber A will cause the piston 44 to move in a direction causing the butterfly valve 40 to close.

Also included in the pressure regulating valve 12 is a regulator poppet to set the pressure the pressure regulating valve 12 will regulate to. A poppet housing 54 contains a diaphragm 56 having a reinforced central portion 58. The diaphragm 56 with reinforced central portion 58 form a chamber C on one side of the poppet housing 54, with the other side being exposed to ambient at location 60. Attached to the reinforced central portion 58 of the diaphragm 56 is a rod 62 leading to a poppet 64 installed in a poppet seat 66. The poppet 64 is kept in its seat 66 by pressure exerted by a spring 68 bearing on the poppet housing 54 and the side of the draphragm 56 and reinforced central portion 58 opposite chamber C. The poppet 64 is urged away from its seat 66 by a spring 70 and pressure in chamber C. Pressure exerted by the spring 70 on the reinforced central portion 58 of the diaphragm 56 is adjustable by turning an adjustment screw 72, which adjusts pressure the pressure regulating valve will regulate to.

The poppet 64 is located in a portion of the poppet housing 54 having a chamber 74 with three openings leading to the chamber 74. The first of these openings is the poppet seat 66, which opening leads to the ambient at the location 60. The second opening to the chamber 74 is a control orifice 76, which is connected to chamber A and to the inlet 30 to the heat exchanger 14, where upstream pressure is sensed. Therefore, upstream pressure will be supplied to chamber A and, through the orifice 76, to the chamber 74.

The third opening to the chamber 74 leads to chambers B and C. (Connections of the pressure regulating valve 12 to the bleed flow modulator 24 will not be discussed at this point, but rather later in conjunction with the description of the bleed flow modulator 24.)

Operation of the pressure regulating valve 12 may now be described. As bleed air begins to flow past the open butterfly valve 40 and the resulting upstream pressure at the entrance 30 to the heat exchanger 14 is sensed and routed to chamber A, and through the control orifice 76 to chambers B and C. As long as the upstream pressure is at or below the desired regulation value, the poppet 64 will remain in a closed position against the poppet seat 66. Consequently, pressures in chambers A and B are essentially equal, and the spring 52 will hold the butterfly valve 40 fully opened. When the upstream pressure reaches the desired regulation value, pressure in chamber C is at a level to just balance the opposing spring preload of the spring 68. Any further increase in pressure in Chamber C will cause the poppet 64 to modulate open, thereby producing a pressure drop across the control orifice 76 since pressure in chamber 74 will be vented to ambient through the poppet seat 66.

When a pressure drop is produced across the control orifice 76, pressures in chambers B and C will be maintained at a constant reference value below the pressure in chamber A. Pressure in chamber A, of course, is not influenced by the action of the poppet 64, and consequently any increase in upstream pressure above the desired value will overcome the force of the spring 52 and the pressure in chamber B, thereby causing the piston 44 to move in the valve housing 46 and to modulate the butterfly valve 40 in a closed direction, thereby tending to reduce the upstream pressure at the entrance 30 to the heat exchanger 14. In this manner, an equilibrium will be reached resulting in the pressure regulating valve 12 causing a more or less constant regulation of pressure at the entrance 30 to the heat exchanger 14.

However, as mentioned previously since the pressure regulating valve 12 may produce a pressure varying by 2.5 psig from the desired value due to mechanical tolerances, in order to maintain a flow through the heat exchanger 14 which is equal to flow through other heat exchangers in the aircraft, it is necessary to utilize the bleed flow modulator 24.

The bleed flow modulator 24 utilizes a diaphragm 80 with a reinforced central portion 82 mounted in a modulator housing 84. On one side of the dipahragm 80 is a chamber connected to the inlet 30 to the heat exchanger 14, and therefore upstream pressure will be applied to this side of the diaphragm 80. On the other side of the diaphragm 80, there is a chamber leading to the outlet 32 of the heat exchanger 14, and therefore downstream pressure will be supplied to the other side of the diaphragm 80. It may therefore be appreciated that the pressure drop across the heat exchanger 14 will cause the diphragm 80 to move as that pressure drop varies. Note also that any pressure drop in the leg supplying bleed air may be used, not just the drop across the heat exchanger.

Also contained in the modulator housing 84 is an L-shaped valve element 86 which pivots about an axis. The valve element 86 is held in a closed position by a spring 88. The valve element 86 is moved in a direction opening it by the diaphragm 80, which has connected to the reinforced central portion 82 a rod 90 which exerts pressure on the valve element 86 tending to cause it to open. Also exerting pressure on the reinforced central portion 82 of the dipaphragm 80 and hence on the valve element 86 is a spring 92, with the net force of the springs 88, 92, holding the valve element 86 closed.

When the valve element 86 opens, it allows ambient air to enter a small tube 94, which tube 94 has a number of apertures in the walls thereof leading to a chamber 96 contained in the modulator housing 84. When the valve element 86 is moved into an open position by the pressure drop across the heat exchanger 14 reaching a certain value, ambient air is allowed to enter the tube 94, and is thereby supplied to the chamber 96. The amount of pressure drop required across the heat exchanger 14 to open the valve element 86 is varied by an adjustment screw 98 which moves the tube 94 into tighter or looser contact with the valve element 86, thereby requiring more or less force, respectively, to open the valve element 86.

It may therefore be appreciated that the bleed flow modulator 24 is a device which provides a pneumatic output signal to the chamber 96 which varies inversely with the sensed differential pressure across the heat exchanger 14, and hence the dipahragm 80. Since the differential pressure across the heat exchanger 14 is proportional to the flow through the heat exchanger 14, the bleed flow modulator 24 prvides an output signal to chamber 96 that varies inversely with the flow of bleed air through the heat exchanger 14.

The chamber 96 is connected to chambers B and C of the pressure regulating valve 12. Therefore, if the flow through the heat exchanger 14 increases beyond a desired level, the valve element 86 in the bleed flow modulator 24 will open, causing pressure in chambers B and C in the pressure regulating valve 12 to drop, which in turn causes the butterfly valve 40 to begin to close. The result is a decrease in flow through the heat exchanger 14, and the system illustrated in FIG. 2 will come to an equilibrium point whereby the desired airflow rate through the heat exchanger 14 is continuously maintained.

Since a bleed flow modulator is used in each of the legs, as for example in FIG. 1 for a two engine aircraft, it will be appreciated that the flow of bleed air supplied from each leg of the bleed air control system will be very nearly identical. Therefore, the situation where a single engine on the aircraft is supplying substantially more bleed air than other engines on the aircraft will be avoided, resulting in substantially improved economy of operation due to both greater fuel economy and reduced engine wear.

What is claimed is:

1. A bleed air control system for use with a multi-engine aircraft, comprising:
   a first heat exchanger having an inlet and an outlet, said outlet of said first heat exchanger being connected to a supply manifold;
   a first pressure regulating valve for regulating the pressure of bleed air from a first engine, said first pressure regulating valve supplying bleed air to said inlet of said first heat exchanger;
   first means for monitoring a first pressure drop between said inlet and said outlet of said first heat exchanger;
   first means for modulating said first pressure regulating valve in response to said first pressure drop to maintain a preselected flow rate from said first pressure regulating valve;
   a second heat exchanger having an inlet and an outlet, said outlet of said second heat exchanger also being connected to said supply manifold;
   a second pressure regulating valve for regulating the pressure of bleed air from a second engine, said second pressure regulating valve supplying bleed air to said inlet of said second heat exchanger;
   second means for monitoring a second pressure drop between said inlet and said outlet of said second heat exchanger; and
   second means for modulating said second pressure regulating valve in response to said second pressure drop to maintain a preselected flow rate from said second pressure regulating valve.

2. A bleed air control system as defined in claim 1, additionally comprising:
   means for adjusting the preselected flow rates from said first and second pressure regulating valves.

3. A bleed air control system for a multi-engine aircraft, comprising:
   first valve means for controlling the amount of bleed air supplied by one engine;
   a first heat exchange means to cool the bleed air supplied by said one engine through said first valve means;
   first means to monitor bleed air pressure upstream of said first heat exchange means to produce a first signal proportional to bleed air pressure upstream of said first heat exchange means;
   second means to monitor bleed air pressure downstream of said first heat exchange means to produce a second signal proportional to the lower bleed air pressure downstream of said first heat exchange means;
   means responsive to said first and second signals to modulate and drive said first valve means to maintain a preselected flow of bleed air from said one engine;

second valve means for controlling the amount of bleed air supplied by another engine;

second heat exchange means to cool the bleed air supplied by said another engine through said second valve means;

third means to monitor bleed air pressure upstream of said scond heat exchange means to produce a third signal proportional to bleed air pressure upstream of said second heat exchange means;

fourth means to monitor bleed air pressure downstream of said second heat exchange means to produce a fourth signal proportional to the lower bleed air pressure downstream of said second heat exchange means; and means responsive to said third and fourth signals to modulate and drive said second valve means to maintain a preselected flow of bleed air from said another engine.

4. The bleed air control system of claim 3 and in addition a common manifold to receive the flow of bleed air from said one engine and said another engine.

5. A bleed air control system for a multi-engine aircraft, comprising:

first valve means for controlling the amount of bleed air supplied by a first engine;

first heat exchange means to cool the bleed air supplied by said first engine through said first valve means;

first means to monitor bleed air pressure upstream of said first heat exchange means to produce a first signal proportional to bleed air pressure upstream of said first heat exchange means;

second means to monitor bleed air pressure downstream of said first heat exchange means to produce a second signal proportional to the lower bleed air pressure downstream of said first heat exchange means;

means responsive to said first signal for driving said first valve means to regulate pressure of the bleed air supplied from said first engine;

means responsive to said first and second signals to modulate said first valve means driving means to maintain a preselected flow of bleed air from said first engine;

second valve means for controlling the amount of bleed air supplied by a second engine;

second heat exchange means to cool the bleed air supplied by said second engine through said second valve means;

third means to monitor bleed air pressure upstream of said second heat exchange means to produce a third signal proportional to bleed air pressure upstream of said second heat exchange means;

fourth means to monitor bleed air pressure downstream of said second heat exchnage means to produce a fourth signal proportional to the lower bleed air pressure downstream of said second heat exchange means;

means responsive to said third signal for driving said second valve means to regulate pressure of the bleed air supplied from said second engine; and means responsive to said third and fourth signals to modulate said second valve means to maintain a preselected flow of bleed air from said second engine generally equal to the preselected flow of bleed air from said first engine.

6. The bleed air control system of claim 5 wherein said driving means for said first valve means comprises means for actuating said first valve means and means for producing a first control pressure of magnitude less than or equal to said first signal, said actuating means driving said first valve means in response to said first signal and said first control pressure, and said driving means for said second valve means comprises means for actuating said second valve means and means for producing a second control pressure of magnitude less than or equal to said third signal, said actuating means driving said second valve means in response to said third signal and said second control pressure.

7. The bleed air control system of claim 6 wherein said actuating means for said first valve means comprises:

a cylinder;

a piston slidably mounted in said cylinder, said piston operating on differential pressure, said first signal being supplied to one side of said piston, said first control pressure being supplied to the other side of said piston; and means for mechanically linking said piston to said first valve means in a manner whereby said first signal tends to drive said first valve means to a closed position and said first control pressure tends to drive said first valve means to an open position.

8. The bleed air control system of claim 7 wherein said actuating means for said second valve means comprises:

a cylinder;

a piston slidably mounted in said cylinder, said piston operating on differential pressure, said third signal being supplied to one side of said piston, said second control pressure being supplied to the other side of said piston; and means for mechanically linking said piston to said second valve means in a manner whereby said third signal tends to drive said second valve means to a closed position and said second control pressure tends to drive said second valve means to an open position.

9. The bleed air control system of claim 8 wherein said actuating means for said first valve means additionally comprises spring means acting on said piston in a manner whereby said spring means tends to drive said first valve means to an open position and said second valve means additionally comprises spring means acting on said piston in a manner whereby said spring means tends to drive said second valve means to an open position.

10. The bleed air control system of claim 8 wherein said means for producing first control pressure comprises a chamber, the pressure in which chamber is said first control pressure, a control orifice through which said first signal is supplied to said chamber and a first poppet valve through which pressure in said chamber is vented to ambient to regulate said first control pressure, and said means for producing a second control pressure comprises a chamber, the pressure in which chamber is said second control pressure, a control orifice through which said third signal is supplied to said chamber and a second poppet valve through which pressure in said chamber is vented to ambient to regulate said second control pressure.

11. The bleed air control system of claim 10 wherein said first poppet valve comprises:

a poppet valve element which, when open, allows pressure in said chamber to be vented to ambient;

a diaphragm mechanically connected to drive said poppet valve element, said first control pressure being supplied to one side of said diaphragm, the other side of said diaphragm being vented to ambient, said first control pressure tending to drive said poppet valve element to an open position; and spring biasing means tending to drive said poppet valve element to a closed position.

12. The bleed air control system of claim 11 wherein said second poppet valve comprises:

a poppet valve element which, when open, allows pressure in said chamber to be vented to ambient;

a diaphragm mechanically connected to drive said poppet valve element, said second control pressure being supplied to one side of said diaphragm, the other side of said diaphragm being vented to ambient, said second control pressure tending to drive said poppet valve element to an open position; and spring biasing means tending to drive said poppet valve element to a closed position.

13. The bleed air control system of claim 12 wherein said spring biasing means of said first poppet valve is adjustable to set the pressure said driving means for said first valve means will regulate pressure to and said spring biasing means of said second poppet valve is adjustable to set the pressure said driving means for said second valve means will regulate pressure to.

14. The bleed air control system of claim 6 wherein said modulating means for said first valve means having means operable to adjust said first control pressure downwardly to cause a corresponding downward adjustment in bleed air flow and said modulating means for said second valve means having means operable to adjust said second control pressure downwardly to cause a corresponding downward adjustment in bleed air flow.

15. The bleed air control system of claim 6 wherein said modulating means for said first valve means comprises a first valve element through which said first control pressure is vented to ambient, thereby reducing first control pressure whenever said first valve element is open and a diaphragm mechanically linked to drive said first valve element, said diaphragm being supplied with said first signal on one side thereof and with said second signal on the other side thereof, said first signal tending to drive said first valve element to an open position, and said second signal tending to drive said first valve element to a closed position, with a preset pressure differential between said first signal and said second signal being required to drive said first valve element to an open position, and said modulating means for said second valve means comprises a second valve element through which said second control pressure is vented to ambient, thereby reducing second control pressure whenever said second valve element is open and a diaphragm mechanically linked to drive second valve element, said diaphragm being supplied with said third signal on one side thereof and with said fourth signal on the other side thereof, said third signal tending to drive said second valve element to an open position, and said fourth signal tending to drive said second valve element to a closed position, with a preset pressure differential between said third signal and said fourth signal being required to drive said second valve element to an open position.

16. The bleed air control system of claim 15 wherein said modulating means for said first valve means additionally comprises spring means tending to drive said first valve element to a closed position and said modulating means for said second valve means additionally comprises spring means tending to drive said second valve element to a closed position.

17. The bleed air control system of claim 15 additionally comprising means for adjusting the value of pressure differential required to drive said first valve element to an open position and means for adjusting the value of pressure differential required to drive said second valve element to an open position.

18. The bleed air control system of claim 19 wherein said first valve element having means to adjust said first control pressure fownwardly until bleed air flow has diminished to a desired preselected level and said second valve element having means to adjust said second control pressure downwardly until bleed air flow has diminished to a desired preselected level.

19. A bleed air control system for a multi-engine aircraft, comprising:

first valve means for controlling the amount of bleed air supplied by one engine;

first heat exchange means to cool the bleed air supplied by said one engine through said first valve means;

first means to monitor the pressure drop across said first heat exchange means;

means to modulate said first valve means in response to the pressure drop across said first heat exchange means to maintain a preselected flow of bleed air from said one engine;

second valve mans for controlling the amount of bleed air supplied by another engine;

second heat exchange means to cool the bleed air supplied by said another engine through said second valve means;

second means to monitor the pressure drop across said second heat exchange means; and means to modulate said second valve means in response to the pressure drop across said second heat exchanger to maintain a preselected flow of bleed air from said another engine.

20. A bleed air control system as defined in claim 2 additionally comprising a common manifold to receive the flow of bleed air from said first engine and said second engine.

21. The bleed air control system of claim 19 additionally comprising a common manifold to which bleed air from said one engine and said another engine is supplied.

* * * * *